United States Patent Office 3,305,408
Patented Feb. 21, 1967

3,305,408
STRIP CLADDING FLUX
Norman T. Dick, London, England, assignor to Babcock & Wilcox, Limited, London, England, a corporation of Great Britain
No Drawing. Filed Nov. 9, 1964, Ser. No. 409,999
Claims priority, application Great Britain, Nov. 12, 1963, 44,703/63
13 Claims. (Cl. 148—26)

This invention relates to cladding by the deposition of weld metal by the submerged arc process using a strip electrode. With this process the arc covers a relatively large area and a broad band of weld metal may be deposited. A difficulty arises, however, in that the arc shows a greater tendency to be unstable than is the case with a wire electrode.

Arc initiation and stability are influenced by the welding flux. Thus, basic fluxes are found to be unsuitable when using a strip electrode and although proprietary acidic submerged arc fluxes are capable of giving satisfactory arc initiation and stability, it has proved impossible by their use to obtain both a good bead shape and a degree of penetration limited to a suitable value.

An object of the invention is to enable a good bead shape and satisfactory penetration to be achieved in the submerged arc process using a strip electrode.

The present invention includes a method of cladding steel by the deposition of stainless steel weld metal by the submerged arc processes using a strip electrode in which the arc is submerged in a flux containing 22–32% manganese oxide, 32–38% silica, 5–15% calcium oxide, 1–6% iron oxide, 10–18% magnesium oxide, 0.75–2.5% potassium oxide and 0.75–2.5% sodium oxide.

In one mode, given by way of example, of performing the invention, the flux contains constituents substantially in the following proportions, manganese oxide 28.1%, silicon 35.2%, calcium oxide 8.1%, iron oxide 3%, magnesium oxide 16.3%, potassium oxide 1.3%, and sodium oxide 1.5%.

The stainless steel strip has a width of between 2 and 2½ inches and a thickness of 0.02 inch or thereabouts. The weld is effected by a conventional welding head supplied with current from a drooping characteristic motor generator and fitted with a strip cladding attachment having copper contact jaws, rollers for guiding the strip into feed rollers, spacers extending between the feed rollers and the contact jaws for preventing buckling of the strip during feeding and flux hoppers mounted on respective contact jaws adjacent the workpiece and adapted to feed the powder onto the workpiece in front of and beyond the welding zone. During the welding operation, relative linear movement is effected between the workpiece and the strip cladding attachment, no relative oscillating motion being required.

During deposition of the stainless steel, approximately 4% of the chromium in the strip is lost through arc transfer and dilution. According to one embodiment of the invention, the amount of chromium in the weld is maintained at a desired value by including 4–5% more chromium in the strip than is required in the weld deposit. Similarly, in a strip containing manganese, the manganese content is increased to compensate for loss thereof during the welding process.

In an alternative embodiment of the invention added to the flux are particles composed of material for compensating depletion of a constituent of the strip and relatively light material giving the particles a specific weight approximately the same as that of the flux.

Thus, the particles comprise ferrochrome and zircon sand bonded together when used in conjunction with a strip containing chromium or manganese alloy and zircon sand bonded together when used in conjunction with a strip containing manganese. Zircon sand is used as the other constituent since it favors ready de-slagging of the weld. It will be appreciated that the particles of ferrochrome or manganese alloy and zircon sand may be mixed with the flux constituents prior to bonding or agglomerating the compounds together.

The flux described gives both a good bead shape and satisfactory penetration in which fusion between the workpiece and the cladding is strictly limited so that while adequate mechanical strength of the bond between the workpiece and the cladding is maintained, dilution of the cladding by the workpiece is slight and the chemical analysis of the deposit is readily controlled and substantialy uniform throughout the full depth of the cladding.

It will be understood that the invention also includes workpieces clad by the method described above.

Although the invention has been specifically described, it will be obvious to those skilled in the art that it is not so limited, but is susceptible of various changes and modifications without departing from the spirit thereof, as set forth in the following claims.

What is claimed is:

1. A method of cladding steel by the deposition of stainless steel weld metal by the submerged arc process using a strip electrode in which the arc is submerged in a flux essentially consisting of 22–32% manganese oxide, 32–38% silica, 5–15% calcium oxide, 1–6% iron oxide, 10–18% magnesium oxide, 0.75–2.5% potassium oxide and 0.75–2.5% sodium oxide.

2. A method as claimed in claim 1, wherein the flux consists of constituents essentially in the following proportions, manganese oxide 28.1%, silica 35.3%, calcium oxide 8.1%, iron oxide 3%, magnesium oxide 16.3%, potassium oxide 1.3% and sodium oxide 1.5%.

3. A method as claimed in claim 1, in which added to the flux are particles essentially composed of material for compensating depletion of a constituent of the strip and relatively light material giving the particles a specific weight approximately the same at that of the flux.

4. A method as claimed in claim 3, wherein the relatively light material is zircon sand.

5. A method as claimed in claim 3, in which the particles are essentially composed of ferrochrome and zircon sand.

6. A method as claimed in claim 3, in which the particles essentially consist of a manganese alloy and zircon sand.

7. A flux suitable for cladding steel by the deposition of stainless steel weld metal by the submerged arc process using a strip electrode, the flux essentially consisting of 22–32% manganese oxide, 32–38% silica, 5–15% calcium oxide, 1–6% iron oxide, 10–18% magnesium oxide, 0.75–2.5% potassium oxide and 0.75–2.5% sodium oxide.

8. A flux as claimed in claim 7 consisting of constituents essentially in the following proportions, manganese oxide 28.1%, silica 35.2%, calcium oxide, 8.1%, iron oxide 3%, magnesium oxide 16.3%, potassium oxide 1.3% and sodium oxide 1.5%.

9. A flux as claimed in claim 7, mixed with particles essentially composed of material for compensating depletion of a constituent of the strip and relatively light material giving the particles a specific weight approximately the same as that of the flux.

10. A flux as claimed in claim 9, wherein the relatively light material is zircon sand.

11. A flux as claimed in claim 9, wherein the particles essentially consist of ferrochrome and zircon sand.

12. A flux as claimed in claim 9, wherein the particles essentially consist of a manganese alloy and zircon sand.

13. A steel workpiece clad by the deposition of stainless steel weld metal by the submerged arc process using a strip electrode in which the arc is submerged in a flux essentially composed of 22–32% manganese oxide, 32–38% silica, 5–15% calcium oxide, 1–6% iron oxide, 10–18% magnesium oxide, 0.75–2.5% potassium oxide and 0.75–2.5% sodium oxide.

References Cited by the Examiner
UNITED STATES PATENTS
3,078,193  2/1963  Jackson _____ 148—26

DAVID L. RECK, *Primary Examiner.*

H. F. SAITO, *Assistant Examiner.*